United States Patent [19]

Kerry

[11] Patent Number: 4,968,080
[45] Date of Patent: Nov. 6, 1990

[54] DEVICE FOR ATTACHING A LIFTING MECHANISM TO A CONTAINER OR THE LIKE

[75] Inventor: Ian J. Kerry, Thirsk, England

[73] Assignee: George Blair Public Limited Company, England

[21] Appl. No.: 342,292

[22] Filed: Apr. 24, 1989

[30] Foreign Application Priority Data

May 4, 1988 [GB] United Kingdom ............... 8810487

[51] Int. Cl.⁵ .......................... B66C 1/66; B66F 9/12
[52] U.S. Cl. ................................. 294/81.2; 294/81.53; 294/82.24; 414/498; 414/607
[58] Field of Search ................... 294/81.1, 81.2, 81.21, 294/81.53, 81.56, 82.1, 82.24, 68.3; 414/546, 458, 498, 547, 607, 608; 410/78, 82

[56] References Cited

U.S. PATENT DOCUMENTS

| | | | |
|---|---|---|---|
| 1,454,587 | 5/1923 | Gunn | 294/82.1 |
| 3,365,229 | 1/1968 | Hitch et al. | 294/81.1 |
| 4,068,878 | 1/1978 | Wilner | 294/81.53 |
| 4,132,325 | 1/1979 | Corompt | 214/515 |
| 4,166,712 | 9/1979 | Öberg | 414/732 |
| 4,231,709 | 11/1980 | Corsetti | 414/458 |
| 4,452,555 | 6/1984 | Calabro | 410/53 |
| 4,824,318 | 4/1989 | Dones | 414/607 |
| 4,854,807 | 8/1989 | Bishop | 414/498 |

FOREIGN PATENT DOCUMENTS

| | | | |
|---|---|---|---|
| 3129105 | 2/1983 | Fed. Rep. of Germany | 294/81.56 |
| 1158473 | 5/1985 | U.S.S.R. | 294/81.2 |

Primary Examiner—Johnny D. Cherry
Attorney, Agent, or Firm—Abelman Frayne Rezac & Schwab

[57] ABSTRACT

A device for attaching a lifting mechanism to a container provided with an aperture through its end wall comprises a probe member secured to the lifting mechanism and including a head portion for location through the aperture in the end wall of the container, and having a surface for abutting a region of the inner face of the end wall bounding the aperture. The probe member further includes a body portion projecting from the container and provided with a surface which abuts a substantially diametrically opposed region of the outer face of the end wall bounding the aperture. On raising the lifting mechanism, the probe member engages the underside of the upper bounding wall of the aperture and is retained in this operative position by co-operation between the surfaces on the head and body portions with the surfaces on the inner and outer faces of the end wall of the container respectively.

5 Claims, 4 Drawing Sheets

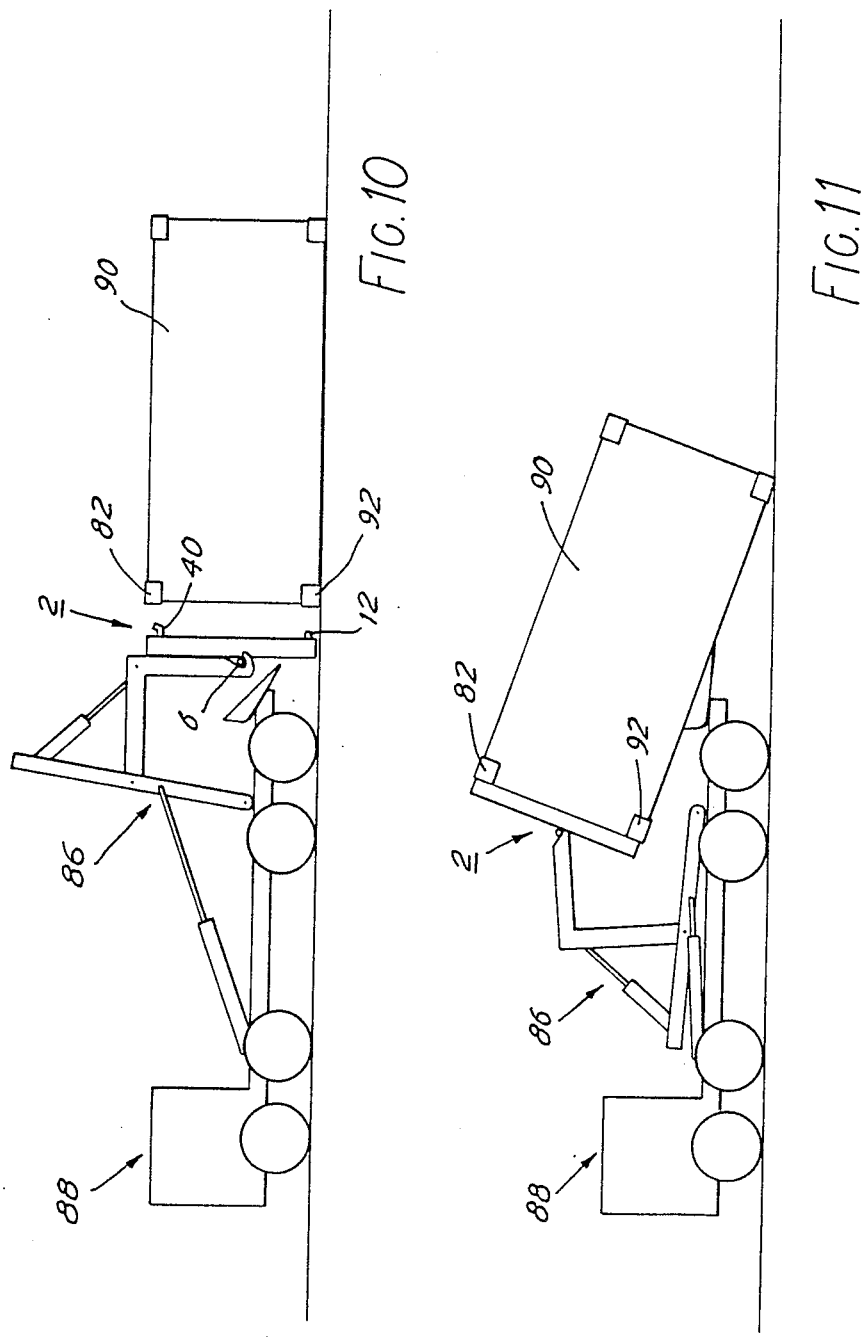

DEVICE FOR ATTACHING A LIFTING MECHANISM TO A CONTAINER OR THE LIKE

BACKGROUND OF THE INVENTION

The present invention relates to devices for attaching lifting mechanisms to containers or the like, and in particular to containers provided with pre-formed apertures therein, such as those in the corner fittings of standard freight containers.

Standard freight containers are provided with corner fittings, each of which comprises a hollow, generally box-shaped component provided with apertures in the outwardly facing walls thereof for receiving therein releasable securing means. Hereinafter, any reference to a corner fitting is to be understood as referring to a corner fitting of the above described type.

Whereas bottom corner fittings of such freight containers are primarily used for locating and securing the containers to transporting surfaces and to each other, using twistlocks or other locking means extending through the generally rectangular or elliptical apertures in the corner castings, the upper corner fittings are such as to permit lifting and maneuvering of the containers.

More particularly, such lifting is usually achieved using a spreader equipped either with built-in twistlocks adapted to be received in the apertures in the upper walls of the upper corner fittings or with hooks which pass through the apertures in the upper walls of the upper corner fittings and through the apertures in the end walls of said corner fittings, said latter apertures commonly being known as 'hook holes'. The interiors of the upper corner fittings between the apertures in the upper walls and the end walls are shaped to accommodate the hooks, as are the hook holes themselves. Said hook holes are each of only slightly asymmetrical shape with no significant difference between the lengths of the major and minor axes and with little flat purchase area therearound within the fittings.

There is currently a need for a device to enable lifting of containers by attachment of lifting frames to the end faces of the containers, and in particular by way of the apertures in the end walls of the upper corner fitting However, it will be appreciated that, because of the particular shape of the apertures in the end walls of the corner fittings, it is not practical to use conventional twistlock-type mechanisms to effect attachment of the lifting mechanisms to the containers because of the limited purchase area available within the fittings for engagement by the heads of the twistlocks.

SUMMARY OF THE INVENTION

According to one aspect of the present invention, there is provided a device for attaching a lifting mechanism to a container or the like provided with an aperture through an end wall thereof, the device comprising a probe member adapted to be secured to the lifting mechanism and including a head portion for location through said aperture in the end wall of the container and into the container, said head portion being provided with a surface thereon which, with the device in its operative position, abuts a region of the inner face of the end wall of the container bounding said aperture, the probe member further including a body portion projecting from the container and provided with a surface thereon which, with the device in its operative position, abuts a substantially diametrically opposed region of the outer face of the end wall of the container bounding said aperture, the arrangement being such that, with the device in its operative position and on raising of the lifting mechanism, the probe member engages the undersurface of the upper regions of the aperture through the end wall of the container and is retained in said operative position by co-operation between said surfaces on the head portion and on the body portion with the surfaces of the inner and outer faces of the end wall of the container.

Although such a device can be used in conJunction with any containers or the like provided with suitable receiving apertures therein, a preferred application of the device of the invention enables attachment of a lifting mechanism to standard I.S.O. freight containers by way of the end apertures in the conventional upper corner fittings provided on such containers.

The invention is particularly suited to incorporation on an adaptor frame as detailed in our co-pending U.S. patent application Ser. No. 141,409, now U.S. Pat. No. 4,854,807, this frame enabling conventional I.S.O. containers to be handled by conventional hook-lift type vehicles without any alteration to the containers or to the vehicles.

More particularly, the adaptor frame is attachable to, to be movable by, the hydraulically-operated lift arrangement mounted on the chassis of the hook-lift type vehicle, the frame including devices according to the first aspect of the invention mounted thereon for co-operation with the upper corner fittings of one end of a freight container whereby said frame can be secured to the container.

According to a second aspect of the invention, there is provided means for adapting a hook-lift type vehicle, having a hydraulically-operated lift arrangement on the chassis thereof, to load and unload freight containers having conventional corner fittings at the corners thereof, the means comprising an adaptor frame for attachment to, to be movable by, the lift arrangement, said adaptor frame including a pair of devices as defined above for co-operation one with each of the two upper corner fittings of the container to secure said frame to the container.

Preferably the adaptor frame comprises a body portion to which the lift arrangement of the vehicle is attached, and a pair of adJustable arm members, each of which is pivotally mounted to the body portion, said arm members each carrying a device as defined above.

Each device may comprise an elongate housing rigidly secured to the associated arm member, the body portion of the probe member being mounted in said housing with the head portion of the probe member proJecting from the housing, the probe member being axially fixed relative to the housing but selectively rotatable relative thereto.

Conveniently, the housing is of tubular shape and the body portion includes a diametrical flange adapted to assist location of the probe member within the housing.

Preferably, the probe member is rotatable within the housing between first and second angularly displaced operative positions, one associated with the arm member in an uppermost position aligning the device with the upper corner fitting of a full height freight container, and the other associated with the arm member in a lowermost position aligning the device with the upper corner fitting of a half height freight container.

The device may further comprise adjustable stop means to locate the probe member in a chosen operative position.

BRIEF DESCRIPTION OF THE DRAWINGS

FIGS. 10 and 11 show adaptor means incorporating devices according to the invention on a hook-lift vehicle in two different positions of the lift arrangement thereof.

DESCRIPTION OF PREFERRED EMBODIMENT

Figure 1:
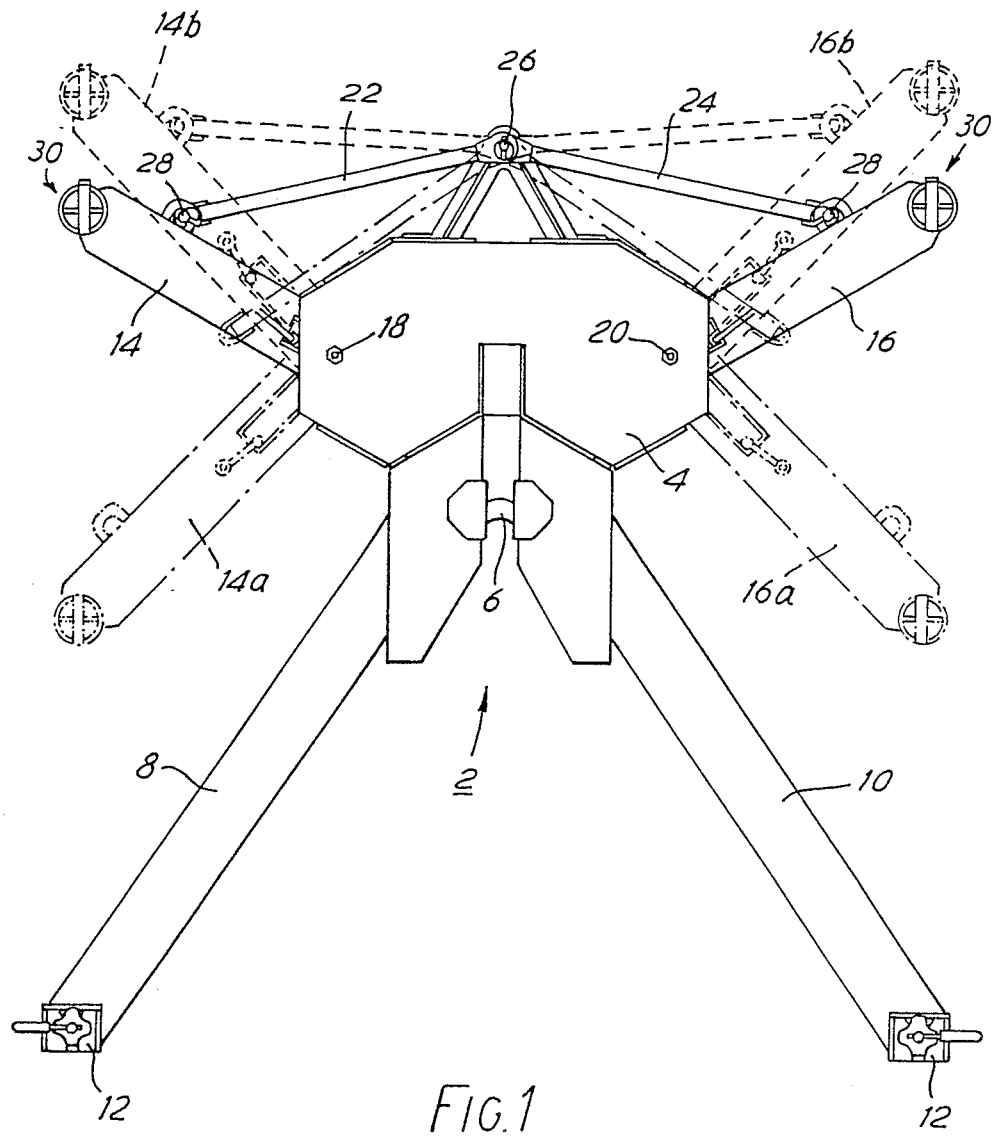
FIG. 1 is a front view of an adaptor frame provided with a pair of devices according to the invention.
Figure 2:
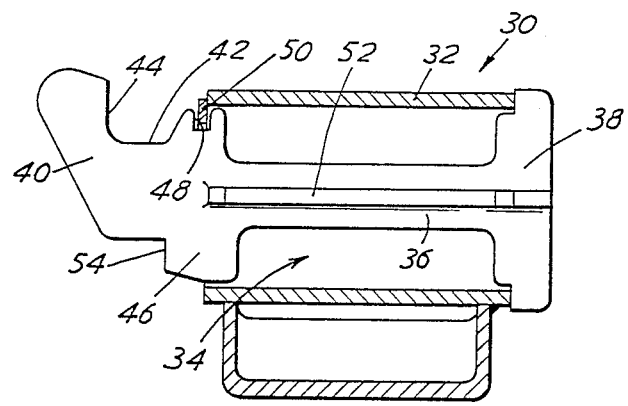
FIG. 2 is a vertical section through a device according to the invention.

Referring to FIG. 1, an adaptor frame is indicated generally at 2 and includes a central body portion 4 provided with a lifting hook bar 6. A pair of arms 8, 10 are rigidly secured to, to extend downwardly and outwardly from, the body portion 4, the free end of each arm 8, 10 carrying a twistlock 12, the twistlocks 12 being spaced 8 feet apart for co-operation with the lower corner fittings of any standard I.S.O. container.

A pair of upper arms 14, 16 are each mounted to the body portion 4 to be pivotal relative thereto about associated pivot points 18, 20, each arm 14, 16 being provided with a slot therein in which the pivot points 18, 20 are received whereby each arm 14, 16 can also move axially thereof relative to the associated pivot point 18, 20 and to the body portion 4.

The combination of the pivotability of the arms 14, 16 about the pivot points 18, 20 and the slidability of said arms relative to their pivot points enables the ends of said arms to be located at positions which align with the upper corner fittings of an I.S.O. container of any standard height as will be described in more detail below.

More particularly, the arms shown in dotted lines at 4a, and 16a are positioned to suit, typically, a 4 feet high container, while those shown in dotted lines at 14b and 16b are positioned to suit, typically, a container 8 feet 6 inches high.

A pair of removable, rigid stays 22, 24 may extend between the body portion 4 and each arm 14, 16, one end of each stay being pivotally mounted at 26 to the body portion 4 and the other end of each stay being pivotally mounted at 28 to the associated arm. The pivotal mountings at 28 are each such as to permit limited linear movement of the arms 14, 16 relative to the associated stays 22, 24.

Heretofore, the free ends of the arms 14, 16 have each carried a twistlock thereon adapted to be located in the upper corner fitting of an associated container, with the twistlocks 12 being located in the lower corner fittings of the container whereby the adaptor frame is secured to said container.

However, the upper twistlocks require manual insertion into the associated corner fittings, and, bearing in mind these twistlocks can be located at heights of up to 8 feet 6 inches, it will be appreciated that there is an inherent safety problem in such an arrangement.

The invention provides devices to replace the upper twistlocks and which are such that they can be inserted into the upper corner fittings of the container by appropriate maneuvering of the adaptor frame and without the necessity for personal attendance at the upper corner fittings.

Referring to FIGS. 2 to 9, an attachment device according to the invention is indicated generally at 30 and comprises an open-ended tubular housing 32 welded or otherwise secured to the free end of an arm 14 or 16 of the adaptor frame. Located within the housing 32 is a hook member or probe member 34 which comprises a body portion 36 extending centrally the length of the housing 32 and carrying an end bar 38 extending substantially diametrically of the housing 32 and adapted to engage the rear end of said housing to determine the operative axial position of the hook member within the housing 32.

The front end of the hook member 34 comprises a head portion 40 projecting from the housing 32 and of generally hook-shape including a recess 42 bounded by an upstanding, rearwardly-facing abutment surface 44.

The body portion 36 further includes an increased diameter portion 46 for location in the front end of the housing 32 and in which is formed a groove 48 adapted to receive therein the free edge of an arcuate retaining plate 50 welded to the front end of the housing 32, said plate 50, together with the end bar 38, locating the hook member axially relative to the housing 32.

The body portion 36 of the hook member 34 includes a pair of lateral flanges 52 projecting therefrom radially of the housing 32 serving to locate the body portion 36 within the housing 32 and facilitating rotation of the hook member 34 within said housing 32.

The increased diameter portion 46 of the body portion 36 includes an upstanding, forwardly-facing abutment surface 54 thereon for reasons which will become apparent.

The configuration of the hook member 34 is such that it can be assembled into the housing 32 by feeding the head portion 40 through the housing from the rear end thereof until the end bar 38 abuts said rear end of the housing, the retaining plate 50 then being welded to the housing 32 whereby axial movement of the hook member 34 relative to the housing 32 is prevented but rotation is permitted.

As mentioned above, the arm members 14, 16 to which the devices 30 are attached have two operative positions, one associated with full height containers and the other with half height containers. The hook member 34 must be capable of adopting the operative position shown in FIG. 2 regardless of the angular position of the arm member 14 or 16 and therefore of the housing 32. Hence, the requirement that the hook member 34 is rotatable relative to the housing 32.

The device further includes means for locating the hook member in its operative position relative to the housing 32 for each position 14a, 16a and 14b, 16b of the arm members 14, 16.

Figure 3:
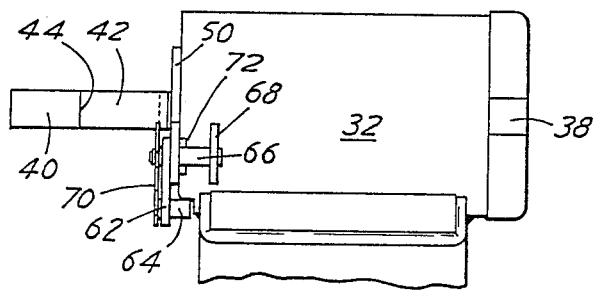
FIG. 3 is a plan view from above of the device of FIG. 2.
Figure 4:
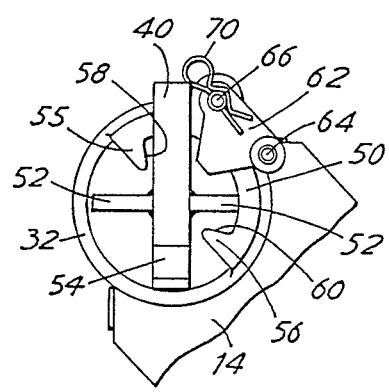
FIGS. 4 and 5 are end views in the direction of arrow A in FIG. 2 of the device in two different operative positions.
Figure 5:
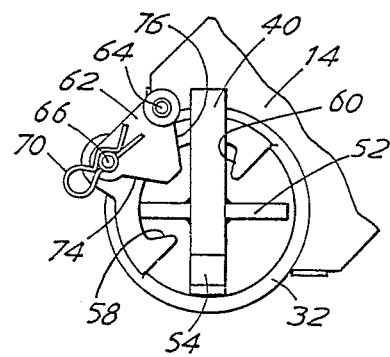

Referring in particular to FIGS. 3 to 5, FIG. 4 shows the arm member 14 in its upper position. The retaining plate 50 includes end portions 55, 56 providing stop surfaces 58, 60 thereon angularly spaced by about 110°. A movable stop plate 62 is pivotal on a pin 64 welded to the housing 32 and is retained in an operative position by means of an axially movable pin 66 mounted in a bracket 68 on the housing 32, the pin 66 extending through a hole in the plate 62 and being retained by a spring 'R' clip 70 located through a diametrical bore in the end of the pin 66. The pin 66 carries a lug 72 secured thereto which prevents removal of the pin 66 from the bracket 68 but permits sufficient freedom of movement of the pin into and out of the movable stop plate. The stop plate 62 includes abutment surfaces 74, 76 thereon.

The operative position of the hook member 34 with the arm member 14 in its uppermost position 14b (FIG. 1) aligning the device 30 with the upper corner fitting of a full height I.S.O. freight container is determined between the surface 58 of the retaining plate 50 and the surface 74 of the stop plate 62 as seen in FIG. 4, there being about 20° of angular movement available to the head portion 40 between these surfaces.

In order to adapt the device for alignment with the upper corner fitting of a half-height container—i.e., with the arm member in the position shown at 14a in FIG. 1—the spring clip 70 is removed from the pin 66, said pin is withdrawn from the removable stop plate 62 and the stop plate 62 is pivoted in a clockwise direction as viewed in FIG. 4 to a position displaced from the arc of movement of the hook member 34. The hook member 34 is then rotated in the housing 32 into abutment with the surface 60 on the retaining plate 50, the stop plate is pivoted back to its operative position shown in FIG. 5, the pin 66 is pushed back through the plate 62 and the spring clip 70 is inserted through the pin 66 to secure the plate in its operative position. The head portion 40 of the hook member 34 is then retained in its operative position between the surfaces 60, 76 again with about 20° angular movement available thereto.

The described arrangement operates as follows. With the devices 30 welded to the arm members 14, 16, the hook members 34 are correctly positioned within the housings 32 dependent upon whether a full height container or a half height container is to be lifted by the frame 2—i.e., dependent upon whether the arm members are in the positions 14a, 16a or 14b, 16b in FIG. 1.

Figure 6:
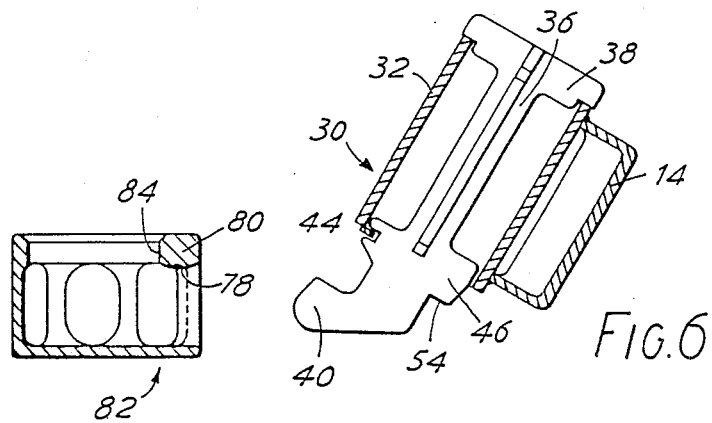
FIGS. 6 to 9 show the procedure for locating the device of FIG. 2 in a corner fitting of a container.

The adaptor frame 2, which s resting substantially vertically on the ground as seen in FIG. 10, is engaged onto the hydraulically-operated lift arrangement 86 of a hook-lift type vehicle 88 by means of the lifting bar 6, and the frame 2 is maneuvered by the lift arrangement 86 to a position with the upper regions thereof angled forwardly of the lower regions. In this position, the head portions 40 of the devices 30 extend downwardly and forwardly as shown in FIG. 6.

Figure 7:
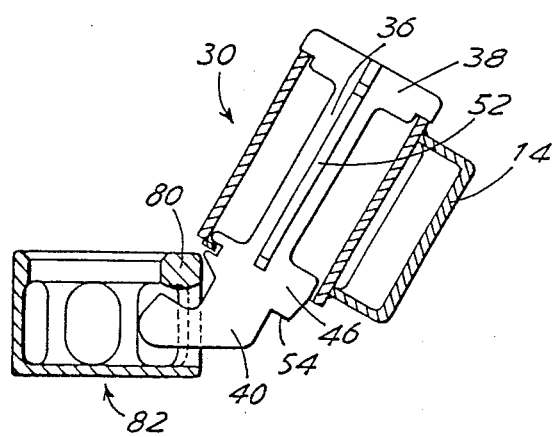
Figure 8:
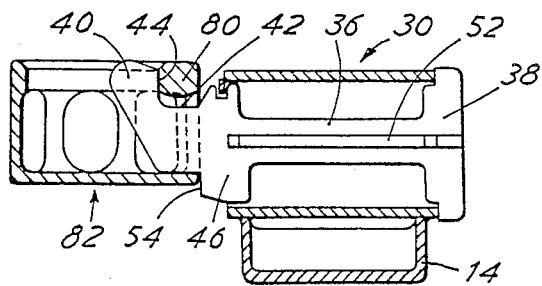

The lift arrangement 86 is further maneuvered until the head portions 40 are aligned with the apertures 78 in the end walls 80 of the associated corner fittings 82 of a container 90, the head portions 40 then entering said apertures 78 as seen in FIG. 7.

The frame 2 is returned to its vertical disposition whereby the surfaces 44 of the head portions 40 engage behind the inner faces of the upper regions of the end walls 80 of the corner fittings 82 and the surfaces 54 of the hook members 34 abut the outer faces of the lower regions of said end walls 80.

The lower twistlocks 12 are manually engaged into the front apertures of the bottom corner fittings 92 of the container 90 and are locked therein to complete the attachment of the frame 2 to the container 90.

The container 90 is then raised by the lift arrangement 86 and is loaded onto the vehicle 88 in the relatively conventional manner associated with the self-loading of dedicated hook-lift flatracks, an intermediate stage of the loading procedure being shown in FIG. 11.

Figure 9:
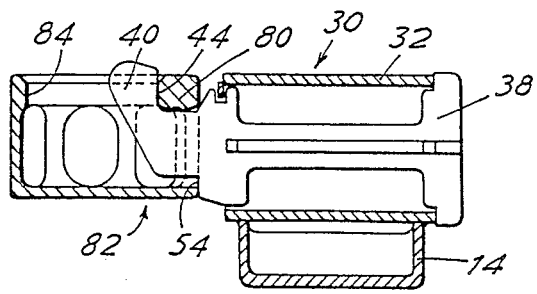

On raising of the container 90 by the lift arrangement 86, the upper regions of the end walls 80 of the upper corner fittings 82 seat in the recesses 42 in the head portions 40 of the devices 30, with the surfaces 44, 54 of the hook members 34 maintaining bearing contact with the associated regions of the end walls 80 of said fittings 82. The free end of the head portion 40 of the hook member 34 projects through the aperture 84 in the top wall of the corner fitting as seen in FIG. 9.

Thus, it will be appreciated that the configuration of the hook members 34 is such that a positive attachment of the adaptor frame 2 to a container 90 is effected through the apertures in the end walls of the upper corner fittings, the surfaces 44, 54 of the hook members creating bearing areas for abutment with the limited areas available on the end walls of said fittings, while the head portions 40, once within the corner fittings 82, cannot be removed or withdrawn therefrom other than by appropriate maneuvering of said head portions - each head portion 40 is thus self-locking within the corner fitting 82 behind the so-called 'hook hole arch' in the end wall of the fitting.

The limited rotational movement of the hook member 34 in the housing 32 between the surfaces 58, 74 or 60, 76 enables the hook member 34 to line itself up relative to the associated corner fitting 82 on initial lifting of the container 90 and also accommodates distortion and damage that may have occurred to the container.

Although described as being mounted on an adaptor frame 2, it will be appreciated that the attachment devices of the invention could be mounted on other lifting mechanisms, while the precise construction of the devices could vary from that illustrated.

What I claim and desire to secure by Letters Patent is:

1. A device for attaching a lifting mechanism to a container having an end wall provided with inner and outer faces thereto, said wall defining therethrough an aperture including an upper region with an undersurface thereto, the device comprising a probe member adapted to be secured to the lifting mechanism and including a head portion for location through said aperture in the end wall of the container and into the container, said head portion being provided with a surface thereon which, with the device in its operative position, abuts an upper region of the inner face of the end wall of the container bounding said aperture, the probe member further including a body portion projecting from the container and provided with a surface thereon which, with the device in its operative position, abuts a lower region of the outer face of the end wall of the container bounding said aperture, the arrangement being such that, with the device in its operative position and on raising of the lifting mechanism, the probe member engages the undersurface of the upper region of the aperture through the end wall of the container and is retained in said operative position by co-operation between said surfaces on the head portion and on the body portion with the surfaces of the inner and outer faces of the end wall of the container, said device including an elongate housing, the body portion of the probe member being mounted in said elongate housing with the head portion of the probe member projecting from the housing, the probe member being axially fixed relative to the housing but being selectively rotatable relative thereto.

2. A device as claimed in claim 1 in which the housing is of tubular shape and the body portion includes a diametrical flange adapted to assist location of the probe member within the housing.

3. A device as claimed in claim 2 in which the probe member is rotatable within the housing between first and second angularly displaced operative positions.

4. A device as claimed in claim 3 and comprising adjustable stop means to locate the probe member in a chosen operative position.

5. Means for adapting a hook-lift vehicle, having a hydraulically-operated lift arrangement on the chassis thereof, to load and unload freight containers having conventional corner fittings at the upper and lower corners thereof, the means comprising an adaptor frame for attachment to, to be movable by, the lift arrangement, said adaptor frame including a pair of devices each as claimed in claim 1 for co-operation one with each of the two upper corner fittings of the container to secure said frame to the container;

said adaptor frame comprising a body portion to which the lift arrangement of the vehicle is attached, and a pair of adjustable arm members each of which is pivotally mounted to the body portion, the devices being mounted one on each arm member;

each said device including an elongate housing, the body portion of the probe member being mounted in the housing with the head portion of the probe member projecting from the housing, the probe member being axially fixed relative to the housing but selectively rotatable relative thereto between first and second angularly displaced operative positions, the first operative position of the probe member of a device being associated with the arm member of the adaptor frame being in an uppermost position aligning the device with the upper corner fitting of a full height freight container, and the second operative position of the probe member of a device being associated with the arm member of the adaptor frame being in a lowermost position aligning the device with the upper corner fitting of a half-height freight container.

* * * * *